United States Patent
Noftz et al.

(10) Patent No.: US 12,134,997 B2
(45) Date of Patent: Nov. 5, 2024

(54) INLETS FOR HYPERSONIC AIR-BREATHING VEHICLES AND DESIGN METHODS AND SYSTEMS THEREFOR

(71) Applicants: Purdue Research Foundation, West Lafayette, IN (US); University of Notre Dame du Lac, South Bend, IN (US)

(72) Inventors: Mark Edward Noftz, Villa Park, IL (US); Joseph Stephen Jewell, West Lafayette, IN (US); Andrew James Shuck, Indianapolis, IN (US); Jonathan Poggie, West Lafayette, IN (US); Andrew Nixon Bustard, South Bend, IN (US); Thomas James Juliano, Granger, IN (US)

(73) Assignees: Purdue Research Foundation, West Lafayette, IN (US); University of Notre Dame Du Lac, South Bend, IN (US)

( * ) Notice: Subject to any disclaimer, the term of this patent is extended or adjusted under 35 U.S.C. 154(b) by 0 days.

(21) Appl. No.: 18/240,818

(22) Filed: Aug. 31, 2023

(65) Prior Publication Data
US 2024/0068427 A1    Feb. 29, 2024

Related U.S. Application Data

(60) Provisional application No. 63/402,570, filed on Aug. 31, 2022.

(51) Int. Cl.
F02K 7/10    (2006.01)

(52) U.S. Cl.
CPC .................................... F02K 7/10 (2013.01)

(58) Field of Classification Search
CPC ....................................................... F02K 7/10
See application file for complete search history.

(56) References Cited

U.S. PATENT DOCUMENTS

| | | | |
|---|---|---|---|
| 7,866,599 B2 * | 1/2011 | Elvin | B64C 30/00 244/53 B |
| 11,325,700 B2 * | 5/2022 | Maxwell | B64F 5/00 |
| 2019/0331024 A1 * | 10/2019 | Maxwell | F02K 7/14 |

OTHER PUBLICATIONS

Patrick Rodi, "The Osculating Flowfield Method of Waverider Geometry Generation", American Institute of Aeronautics and Astronautics, AIAA-2005-0511, 43rd AIAA Aerospace Sciences Meeting and Exhibit, Reno, Nevada, Jan. 10-13, 2005, pp. 1-7. (Year: 2005).*

* cited by examiner

*Primary Examiner* — Lorne E Meade
(74) *Attorney, Agent, or Firm* — Hartman Global IP Law; Gary M. Hartman; Domenica N.S. Hartman

(57) ABSTRACT

Systems and methods capable for use in the development of high-speed, shape-transitioning, inward-turning inlets for air-breathing hypersonic vehicles, and inlets formed thereby. The systems and methods preferably provide for designing high-speed inlets for air-breathing hypersonic vehicles, wherein unique solutions are defined in each osculating plane of the inlet. Such systems and methods optionally provide an optimization process for tuning the post throat-shock Mach number of the inlet, and/or designs a shock-capture surface using a parallel-streamlines methodology, and/or a double cowl-lip geometry to allow flow to spill overboard.

9 Claims, 11 Drawing Sheets

| Geometry Variables | Symbol |
|---|---|
| Total Contraction Ratio | CR_contour |
| Inlet Aspect Ratio | AR_inlet |
| Inlet Superellipse Exponent | n_inlet |
| Isolator Aspect Ratio | AR_isolator |
| Isolator Superellipse Exponent | n_isolator |
| Leading Edge Deflection Angle(s) | defl_angle |
| Centerbody Radius (iterated) | centerbody_radius |

Table 1. Geometric Inputs for the Inlet Generator

| Flow Variables | Symbol |
|---|---|
| Freestream Mach Number | M_0 |
| Isolator Mach Number(s) | M_iso |
| Ratio of Specific Heats | g |

Table 2. Flow Condition Parameters for the Inlet Generator

| Tolerance Variables | Symbol |
|---|---|
| Streamline Tolerance | TOL.Mpm |
| Geometric Tolerance | TOL.R |
| Isolator Mach Tolerance | TOL.M3 |
| Smoothing Iterations (max) | z_sm |

Table 3. Tolerance Input Variables for the Inlet Generator

| Discretization Variables | Symbol |
|---|---|
| Number of Osculating Planes | nn-1 |
| Batch Number | batch_num |
| ODE Step Size | step |
| Max Array Size | save |
| Lower Surface Flat Size | plotn |

Table 4. Discretization Input Variables for the Inlet Generator

FIG. 9

| Inlet Name | User Inputs | Increasing Effect | Decreasing Effect |
|---|---|---|---|
| Unoptimized Baseline | Default Values | - | - |
| Optimized v1 | $M_3 = 3$ | CR, $P_{throat} / P_\infty$ | Length, ICR |
| Optimized v2 | $M_3 = 3$, OC = 2.6 | $P_{throat} / P_\infty$ | Length, ICR, CR |
| Optimized v3 | $M_3 = 3$, $\delta = 8°$ | CR, $P_{throat} / P_\infty$ | Length, ICR |
| Optimized v4 | $M_3 = 3$, CR = 10 | Length, ICR, CR, $P_{throat} / P_\infty$ | - |
| Optimized v5 | $M_3 = 3.5$ | Length, ICR, $P_{throat} / P_\infty$ | CR, $P_{throat} / P_\infty$ |

Table 5. Input Parameters and Resulting Effect for the Inlet Family

FIG. 9 (cont'd)

INLETS FOR HYPERSONIC AIR-BREATHING VEHICLES AND DESIGN METHODS AND SYSTEMS THEREFOR

CROSS-REFERENCE TO RELATED APPLICATIONS

This application claims the benefit of U.S. Provisional Application No. 63/402,570 filed Aug. 31, 2022, the contents of which are incorporated herein by reference.

STATEMENT REGARDING FEDERALLY SPONSORED RESEARCH OR DEVELOPMENT

This invention was made with government support under FA8650-20-2-2405 awarded by the Air Force Research Laboratory. The government has certain rights in the invention.

BACKGROUND OF THE INVENTION

The present invention generally relates to inlets and intakes for capturing and compressing freestream air for combustion within an engine. The invention particularly relates to systems and methods for the development of high-speed, shape-transitioning, inward-turning inlets and intakes for air-breathing hypersonic vehicles, and to inlets and intakes formed thereby.

Devices that capture and compress freestream air for combustion within an engine are commonly referred to as inlets or intakes (hereinafter, collectively referred to as inlets). High speed inlets are a fundamental part of air-breathing engine development. Air-breathing hypersonic vehicles are especially sensitive to the inflow state of captured air and generated shock structure from the inlet surface. These inlets are usually molded onto aircraft structures and bodies, which means they transition from a forward capture shape to a given downstream isolator shape. Inlets for air-breathing hypersonic vehicles must also operate and start effectively. For these instances, an inlet's self-startability becomes important for resiliency. As such, the development of inlets and their operability are vital to all downstream components in hypersonic vehicles and other air-breathing systems.

Design and testing of inlets to evaluate their core objectives—to capture and compress freestream air—are complicated by the physics of compressible gas dynamics. To reduce risk and uncertainty in performance, flight test systems have primarily used axisymmetric outward-turning isentropic spikes or two-dimensional ramp inlets. The academic literature contains numerous studies that focus on these simple geometries to hone in on specific phenomena. Although easy to analyze, two-dimensional ramp and axisymmetric intakes lack compression efficiency and usually incorporate a high amount of on-design spillage. Additionally, these intakes often feed directly into rectangular isolators, which are less structurally efficient and have higher drag and cooling requirements than round designs. Therefore, it would be desirable to create a three-dimensional intake capable of creating a uniform flow into an elliptical or circular isolator.

Shape-transitioning inlets and inward-turning inlets, although not as widely studied, provide several advantages over axisymmetric outward-turning and two-dimensional ramp inlet designs. Shape-transitioning (shape-transitioned) inlets can be molded onto fuselages of conceptual and radical design concepts. Inward-turning inlets are shorter than comparable two-dimensional inlets for the same designed compression ratio and spill less airflow than two-dimensional designs. Because contraction ratios and mass capture efficiencies of inward-turning inlets are higher, the starting characteristics of the intake become problematic at off-design conditions. Inward-turning designs often have to account for unfavorable starting scenarios by incorporating area relief, spill notches, and less aggressive internal contraction ratios. Still, merging shape-transitioning inlet and inward-turning inlet design concepts would have the potential to enable design engineers to retain the advantages of both ideas, significantly improving the capability of future systems.

A first step to designing an intake is to select a parent flowfield that will capture freestream air and compress it to the desired static pressure and Mach number. One such parent flowfield is the classic Busemann diffuser whose axisymmetric flowfield is capable of very efficient compression at supersonic Mach numbers. Though efficient, the overall length of a Busemann diffuser poses structural, drag, machinability, and heat transfer concerns, and the intake is truncated to reduce stagnation pressure recovery. However, simply truncating the intake at a certain point results in a curved leading-edge shock, which negatively impacts flow uniformity and results in flow distortion. Therefore, it is desirable to have a straight leading-edge shock. A different conical flowfield solved from the Taylor-Maccoll equations rectifies this issue. This approach, known as the internal conical flow A (ICFA) solution, solves a conical flow contour downstream of a leading oblique shock wave. The ICFA contour can be stitched to a truncated Busemann intake to create a base flowfield, termed the internal conical flow C (ICFC), that is highly efficient while retaining excellent flow uniformity.

Although the ICFC flowfield is capable of satisfying intake requirements related to preparing the flow for combustion, it fails to allow for intake starting for more than very mild contraction ratios. Intake unstart can be caused by many mechanisms; large vehicle attitudes, high backpressure, and high contraction ratios in the intake are all common unstarting mechanisms. For intake design, an estimate for the starting contraction limit for the over-compression mechanism is given by the Kantrowitz criterion, which for the minimum intake exit-to-capture ratio is 0.63 for a weak throat shock in a high-efficiency configuration operating at Mach 6. This, however, is considerably higher than the ratio given by the classical Busemann- and ICFC-style flowfields for any significant compression at high Mach numbers. Therefore, a technique has to be used to reduce the contraction of these highly efficient base flowfield types.

Stream-tracing techniques have gained considerable attention as methods to design shape-transitioned intakes. Many inward-turning inlet designs can trace their lineage back to methodologies for designing streamline-traced planar and axisymmetric inlets for hypersonic air-breathing engines, including inward-turning inlets. Billig et al., "Streamline Tracing: Technique for Designing Hypersonic Vehicles," Journal of Propulsion and Power, Vol. 16, No. 3, May-June 2000, and Billig et al., "Design and Analysis of Streamline Traced Hypersonic Inlets," 9th International Space Planes and Hypersonic Systems and Technologies Conference and 3rd Weakly Ionized Gases Workshop," 1-5 Nov. 1999, Norfolk VA. The method solved the Taylor-Maccoll equations for the Busemann solution. The solution is an inviscid streamline that generates a converging, conical flowfield. The streamline is then scaled to fit within the inner and outer limits of some defined shape. Although the shape was a design variable, it was not a true shape-transitioning inlet design because the inlet and exit had to match. Nevertheless, the geometry could create inlets that sported cowl cut-backs that improved startability. Streamline-tracing techniques can also provide ways to relieve the internal contraction ratio (ICR) of the original axisymmetric parent flowfields.

During a design process utilizing a stream-tracing technique, a capture shape and an isolator exit shape are defined. If necessary, several intermediary shapes can be defined to enhance the shape-transitioning process. Smart, "Design of Three-Dimensional Hypersonic Inlets with Rectangular-to-Elliptical Shape Transition," Journal of Propulsion and Power, Vol. 15, No. 3, May-June 1999, and Smart, "Experimental Testing of a Hypersonic Inlet with Rectangular-to-Elliptical Shape Transition," Journal of Propulsion and Power, Vol. 17, No. 2, March-April 2001. The empirical function blends two or more streamlines together. Matching two or more streamlines from the parent flowfield to follow the inner and outer radii creates an intake that allows for mass spillage when operating off-design and a relieved ICR that satisfies the starting conditions. The blending of streamlines is a fundamentally geometric technique that is an averaged combination of several different compression streamlines. This makes the final surface definition hard to analyze analytically and necessitates computational fluid dynamics (CFD) and experimental verification of the resulting flowfield.

The above-noted inlet design methods rely on scaling one Busemann Diffuser solution (untruncated/truncated) to create an inward-turning geometry. Certain shape-transitioning inlet design methods also use streamline morphing of two or more Busemann Diffuser solutions to create inlet geometries. Such inlet designs may include a notch or cowl-lip (hereinafter, cowl notch) that allows flow to spill overboard, which is important for downstream requirements in an air-breathing engine.

A more recent method utilizing osculating axisymmetric planes (OAPs) allows designers to create complex three-dimensional (3-D) wavecatcher intake geometries based on multiple two-dimensional (2-D) solutions of the chosen parent flowfield. The osculating axisymmetric (OA) theory of stream tracing follows an aerodynamic transition by solving unique parent flowfields for each defined radial slice of an intake. The two-dimensional parent flowfields also contain their own unique origin points and centers of curvature. Historically, this method has been applied to the design of high-speed waveriders, but has also been applied to the design of several three-dimensional, high-speed, and shape-transitioned intakes. The OA theory solves a conical flowfield in discrete slices (osculating planes (OPs)) that are assumed to be irrotational. In order for this assumption to hold, the leading-edge oblique shocks must remain at constant strength across the azimuthal domain. The theory has been successful at determining the external shockwave shapes over arbitrarily defined hypersonic waverider geometries. The method solved the Taylor-Maccoll equations for external flow over a cone. In addition to a streamwise body contour and shockwave shape, the analytical pressures were verified with CFD calculations. When applied to inlets, osculating axisymmetric theory can create shape-transitioning inlets with conical flowfields generated from multiple unique Busemann contours.

Advantages of utilizing OAP include higher on-design mass capture, higher total pressure recovery, and finer control of the intake's aerodynamic properties. Viscous effects on shock angles, flow constriction due to boundary-layer growth, and flow separation can all reduce the uniformity of intake exit flow. Boundary-layer separation drastically reduces efficiency while increasing the chances of unstart. It is, therefore, imperative to account for viscous effects in the design of an intake. To offset the constriction and change in effective geometry by the presence of a boundary layer, a full viscous simulation of the intake can be run and the geometry can be offset by the local displacement thickness. Flow separation, which is a product of adverse pressure gradients, should be minimized as much as possible. Nonetheless, if the shock train system creates large adverse pressure gradients, it is critical to investigate flow separation at walls where the shock impingement occurs.

Notwithstanding the above, there are certain limitations or shortcomings associated with existing inlet design techniques for hypersonic air-breathing vehicles, including less efficiency in terms of complexity of use and the resulting designs as they rely on scaling one Busemann Diffuser solution (untruncated/truncated) to create an inward-turning geometry. Therefore, it would be desirable if inlet design methods were available that were capable of at least partly overcoming or avoiding the limitations or shortcomings associated with existing inlet design.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, systems and methods capable for use in the development of high-speed, shape-transitioning, inward-turning inlets for air-breathing hypersonic vehicles, and to inlets formed thereby.

According to a nonlimiting aspect of the invention, the systems and methods provide for designing high-speed inlets for air-breathing hypersonic vehicles, wherein unique solutions are defined in each osculating plane of the inlet. Such systems and methods optionally provide an optimization process for tuning the post throat-shock Mach number of the inlet, and/or designs a shock-capture surface using a parallel-streamlines methodology, and/or a double cowl-lip geometry to allow flow to spill overboard.

Technical aspects of systems and methods having features as described above preferably include the capability of their use for designing hypersonic air-breathing inlets, which preferably have the ability to be designed to operate in an on-design mode for a given freestream Mach number with a shock-on-lip condition, stitching together unique osculating solutions to form a three-dimensional inlet shape that allows for minimal flow spillage.

Other aspects and advantages will be appreciated from the following detailed description as well as any drawings.

BRIEF DESCRIPTION OF THE SEVERAL VIEWS OF THE DRAWING

FIG. 9 contains Tables 1 through 5, which list inputs, parameters, and variables utilized in investigations relating to nonlimiting aspects of the invention.

DETAILED DESCRIPTION OF THE INVENTION

Figure 1A:
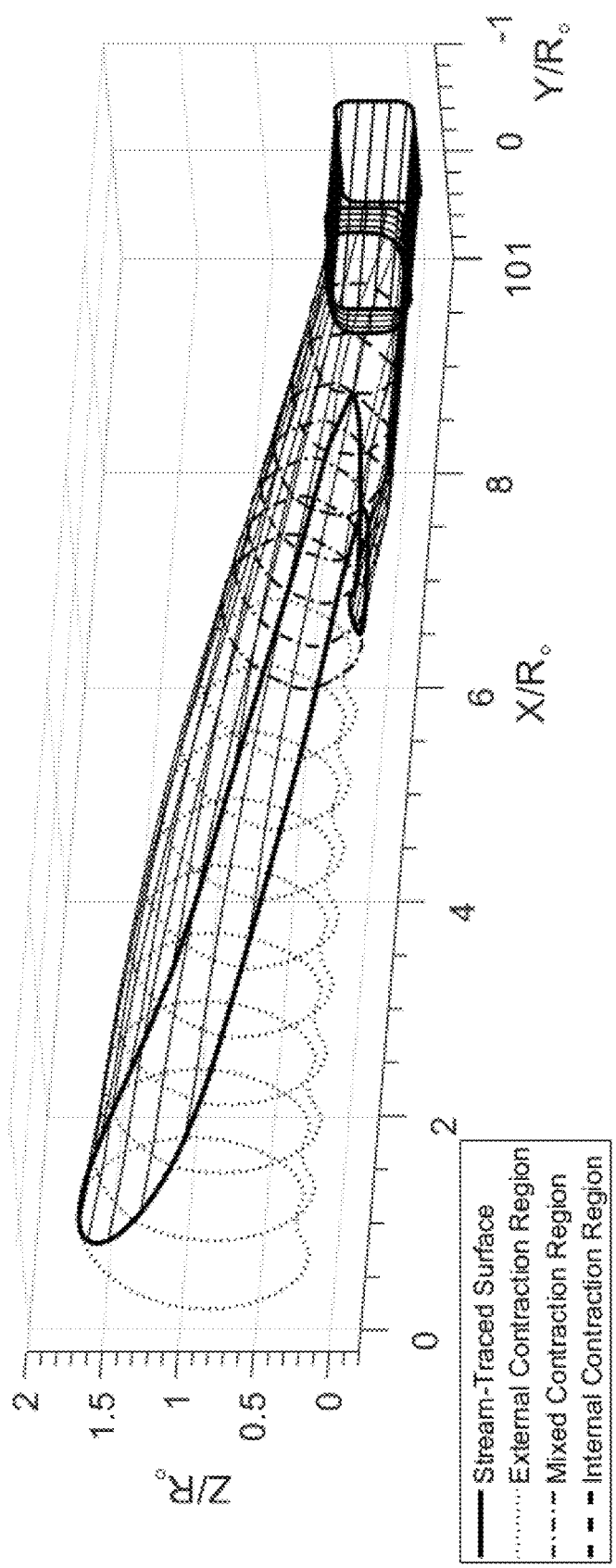
FIGS. 1A through 1D graphically represent perspective, front, side, and top views of an embodiment of an inlet shape in accordance with a nonlimiting aspect of the invention.
Figure 1B:
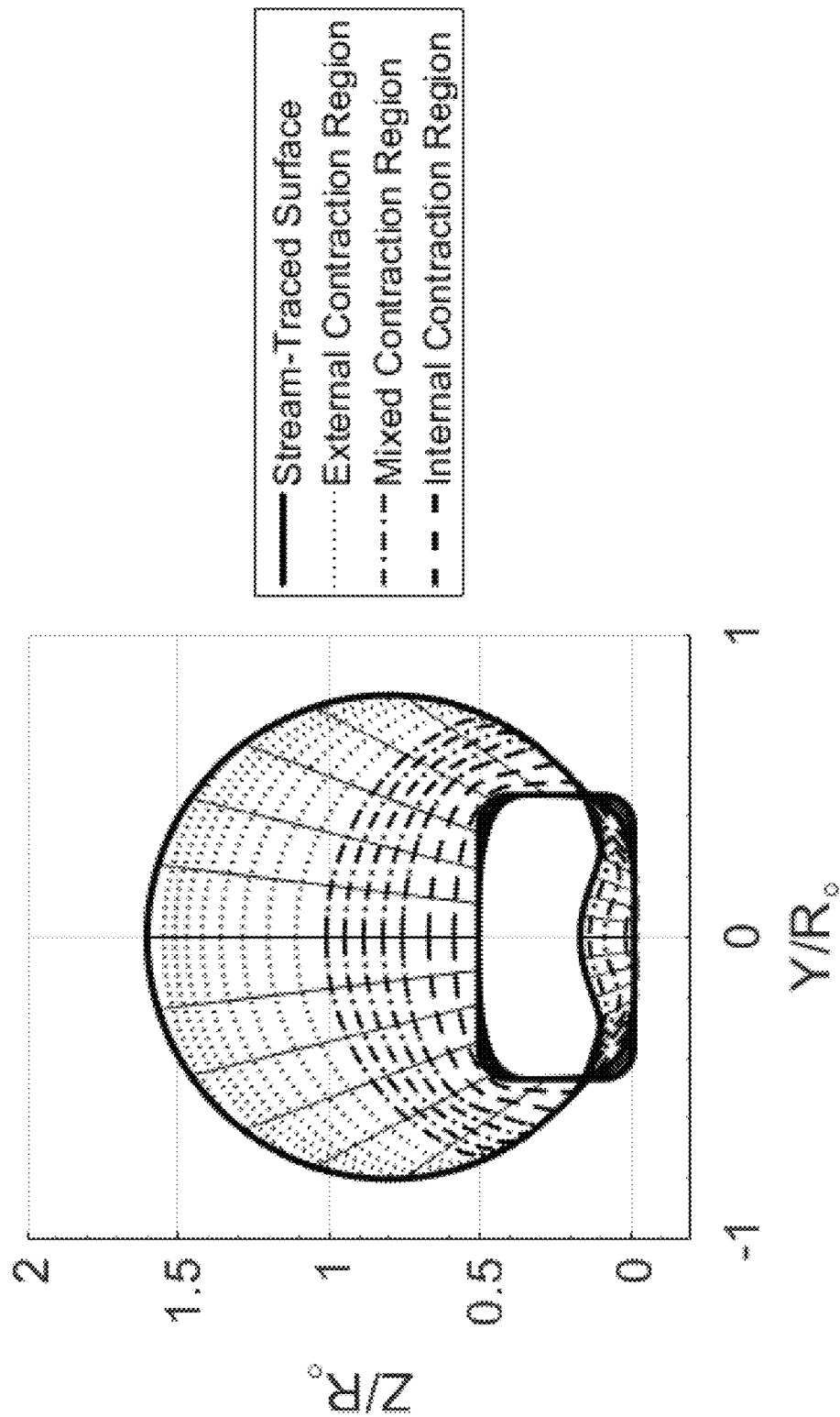
Figure 1C:
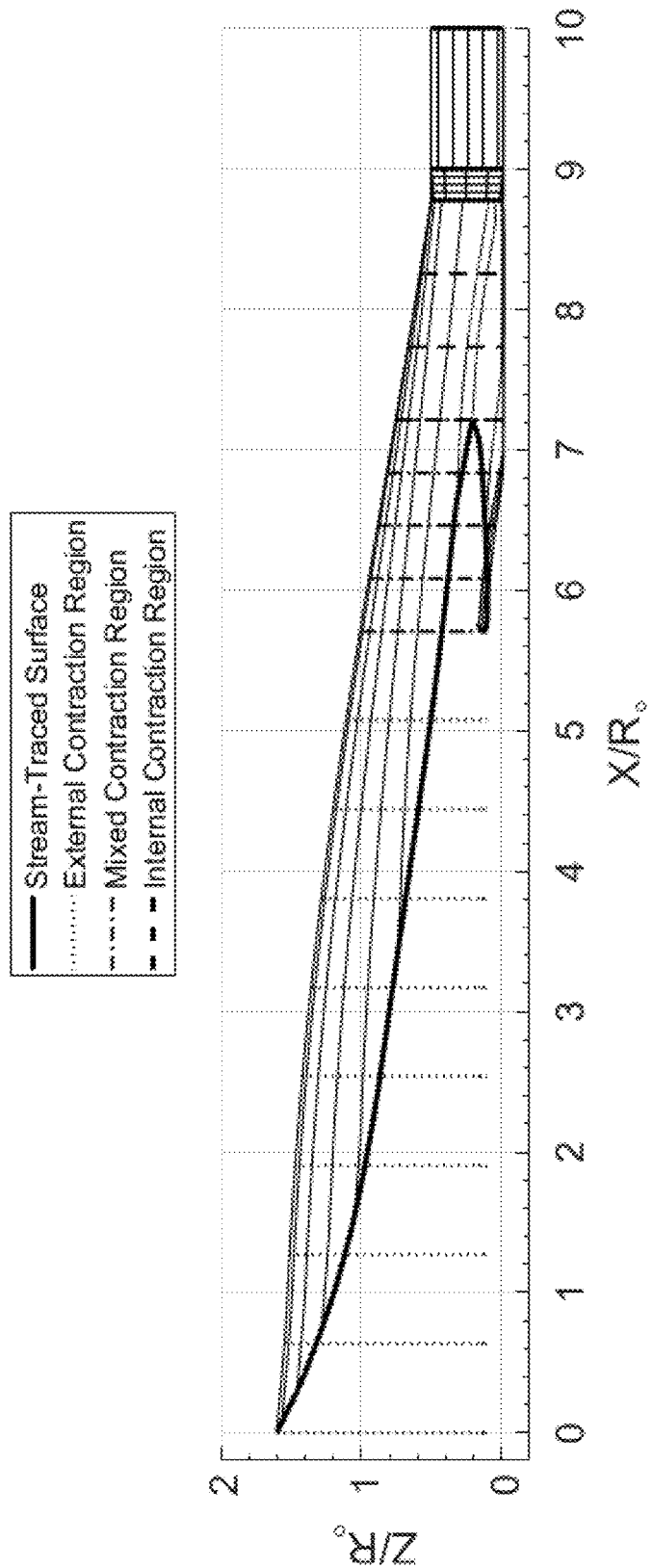
Figure 1D:
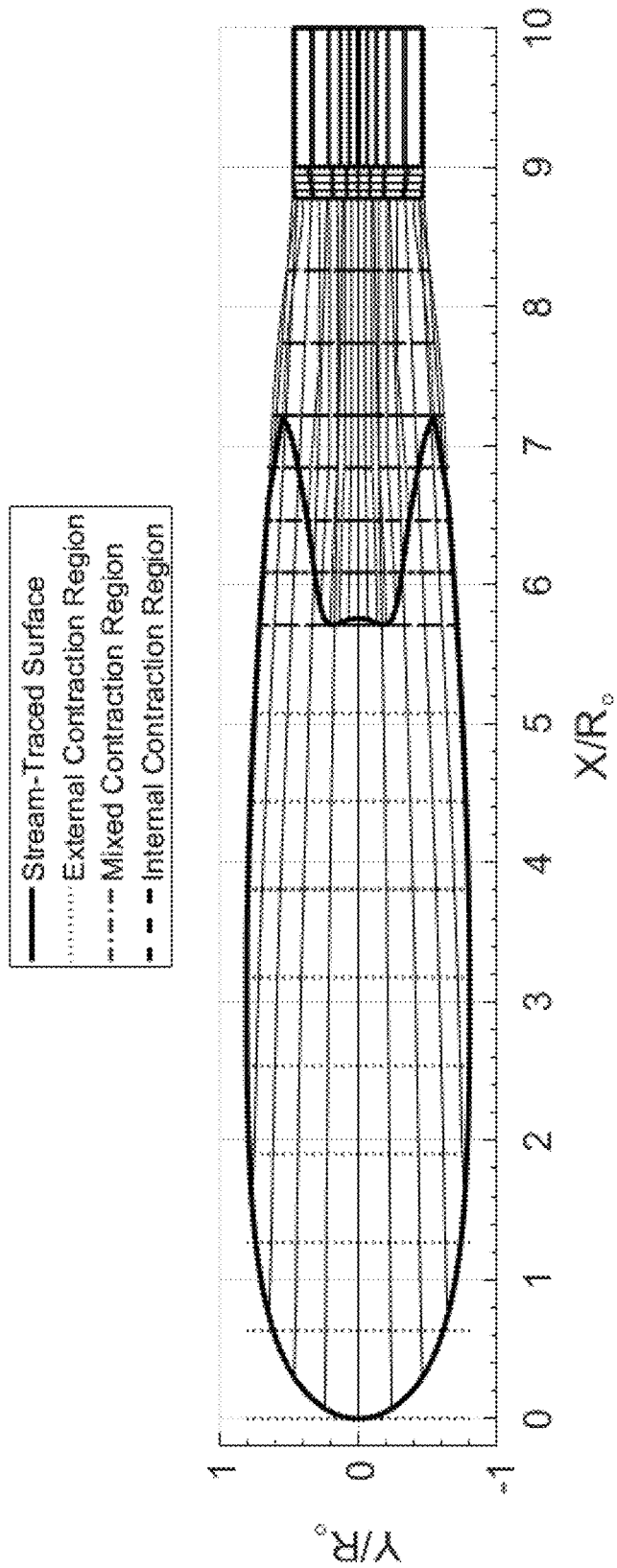

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) to which the drawings relate. The following detailed description also describes certain investigations relating to the embodiment(s), and identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

The following describes a stream-tracing method for the development of high-speed inlets. Inlets derivable with this method include shape-transitioning and inward-turning, and are preferably characterized by being mixed contraction and self-startable. A capture shape and an isolator shape are discretized from a user-defined origin point. Rays that intersect the capture and isolator shapes are then projected forward to create an osculating plane (OP). The theory of osculating axisymmetric is applied, which states that all flow within each osculating plane is locally two-dimensional and irrotational. These osculating planes are defined over an azimuthal sweep of the inlet and contain the streamline solutions from the stream-tracing program.

The upper compression surface is stream-traced from a unique two-dimensional parent flowfield. The parent flowfield is a combination of two inviscid contours solved from the Taylor-Maccoll equations: the Busemann Diffuser and internal conical flow A (ICFA) solutions. The merging of these streamlines creates an inward-turning and highly efficient parent flowfield with a straight leading-edge shockwave. This contour, corresponding to a base flowfield (internal conical flow C, or ICFC), is then iterated to fit within strict geometric radial limits defined by a given shape transition. A third optimization loop varies the free variable called the centerbody. Modifications to the centerbody height cause the throat shock strength to change. This allows for a tuning of the post-shock Mach number in the isolator for each 2D flowfield. Iteration of these three processes repeats until a defined tolerance limit is met for the streamline loop, geometric loop, and post-shock Mach number loop.

The lower shock-capture surface duplicates the streamline from the upper compression surface for that specific osculating plane. This streamline is then shrunk to fit within the theoretical shock intersection point of the ICFC flowfield. This allows the inlet to operate in an on-design mode for a given freestream Mach number with a shock-on-lip condition. This condition allows for minimal flow spillage, which is important for downstream requirements in an air-breathing engine. The lower shock-capture surface contours close the geometry and turn the flow parallel into the isolator. The combined upper and lower shock-capture surface is completed for all osculating planes. These solutions are then stitched together to form a three-dimensional inlet shape. A nonlimiting embodiment of such an inlet shape is depicted in FIGS. 1A through 1D.

Nonlimiting embodiments of the invention will now be described in reference to experimental investigations leading up to the invention.

Stream-Tracing Outline

Methods and systems relating to this invention encompass an inlet design tool that applies the osculating axisymmetric (OA) assumption to characterize, define, and create high speed, inward-turning, and shape-transitioning inlets. The method was compelled by a desire to produce open-source inlet geometries that could satisfy academic inquiry into relevant inlet aerodynamic phenomena. This disclosure discusses in part a design code for achieving such a capability.

The method may utilize MATLAB and combine several scripts that complete different steps in the stream-tracing process. Three of these scripts may be parallelized for faster run-times on multi-core processors, compute clusters, or high-performance supercomputing resources. The stream-tracing code utilizes the signal processing, symbolic math, parallel computing, and instrument control toolboxes of MATLAB. The stream-tracing code can be solved serially and solution smoothing steps can be accomplished manually, however in preferred embodiments the code functionalizes and automates these steps.

The main script calls a file that contains user-defined inputs into the program. The program then sets the parallel-pool based on the number of free logical processors on the system. This activates the maximum amount of CPUs on the available system for the program. After this step, the program continues into the main scripts that create the inlet. The accompanying scripts can be run independently if troubleshooting or tweaking is required.

Shape Transition Definition Script

The shape transition function specifies the hypothetical frontal inlet shape and the isolator exit shape. These shapes can be solved from super-ellipse equations that were historically used to create the NASA rectangular-to-elliptical shape-transition (REST) inlets. The user can specify a certain shape by changing the super-ellipse exponent value and then stretch or contract that shape through a defined aspect ratio. Many shapes, such as squares, circles, diamonds, or stars, can be defined. Besides defining the inlet and exit shapes, this script also iterates on the centerbody radius to match a design contraction ratio (CR). The iteration of this value is not parallelizable and it may not converge, and therefore should be verified that this parameter converges correctly. Because the CR value is an estimate, this input variable should be over-estimated as final CR values may be 10-30% lower than the given input. The script also discretizes the shape along an azimuthal sweep emanating from the origin. The intersection points of the ray along the sweep determines the radial limits of integration for the stream-tracing routine. This process is parallelized for faster run-times. If errors occur within this routine, it is most likely occurring from unsolvable radial limits that were defined from this function.

Stream-Tracing Routine Script

The stream-tracing routine script creates the aforementioned inviscid contours derived from the Taylor-Maccoll equations that constitute the sugar-scoop geometry of the inlet. The process iterates through several million possible solutions of the differential equations to find a solution set that satisfies all constraints. It has been observed that many different solutions exist to the same constraint on a single osculating plane (OP). Thus, more than one inlet may exist for a particular shape transition or given input. In investigations leading to the invention, this routine was parallelized in the outer-most l-loop by allowing individual OP solutions to be solved independently.

Stream-Tracing Routine

The method applies a unique approach to OA theory. Unique Busemann solutions are solved in each osculating plane and merged with a leading ICFA contour. The ICFA contour creates a straight leading-edge shockwave of known strength. It is solved from the Taylor-Maccoll equations by changing the boundary conditions. The ICFA contour is merged with the Busemann contour at a point that matches the expansion Mach number of the flow as it turns at the merging point. This is accomplished by iterating on throat shock angle within the code's inner-most i-loop. Once the streamline is merged, the total radial width of the streamline is compared with the limits defined by the shape transition. If the streamline is too tall or too short, the pre-shock Mach number at the throat is iterated. The j-loop completes the radial convergence iteration. This coupled process is repeated until a solution is found that satisfies both the streamline and geometric convergence limits.

To satisfy OA theory, the ICFA contours are the same in each OP to reduce the effects of azimuthal pressure gradients. However, if OA theory is willfully broken, the azimuthal shock strength can be tailored as a function of the azimuthal angle. The effects of this change on inlet operability remain a free variable in the code. To reduce complexity, the ICFA deflection angle can be made constant for all OPs.

The optimization loop focuses on the post-shock Mach number at the throat for individual OPs. A third variable, called the centerbody parameter, can be added as a radial offset to the entire Busemann contour. Since the leading-edge shockwave angle is fixed, the throat shock angle is forced to change. This, in turn, changes the shock intersection point of the leading edge and throat shockwaves. The centerbody acts as a fictitious wall from which the leading edge and throat shocks are focused. Modifying this free variable allows the user to control the Mach number past the throat shock, which is done in the k-loop. This can potentially reduce inlet distortion or improve the chances of hitting a targeted isolator inflow condition. The optimization parameter can be changed for each OP, and can be made a function of azimuthal angle to give the user more freedom to create new inlet shapes.

Solution Smoothing Script

The solutions derived from the stream-tracing routine function will not always converge. For numerical and/or geometric reasons, certain OPs may fail to reach a solution or will find a solution that exceeds the tolerance bounds. A check of the residuals against the defined tolerance is preferably automatically performed in this script. Since there are three loops (streamline, geometric, and optimization), there are three independent solutions for each OP: pre-shock throat Mach number, throat oblique shock angle, and centerbody radius. These values are filtered by removing OPs that failed to converge or OPs that converged to a value that is too far from a neighboring value. Many non-unique solutions exist for an OP, and forcing neighbors to act similarly improves run time performance and reduces perturbations in the generated geometry. As such, gaps in the solutions are interpolated and smoothed by a moving polynomial filter. This process can be automatic and repeated several times to remove extraneous outliers. The filtered solutions can then be saved and fed back into the stream-tracing routine.

A separate loop contains the stream-tracing routine and the solution smoothing scripts. This loop re-runs the stream-tracing routine with updated, smoothed solutions. The automatic re-running of the program can remove perturbations in the geometry and provides better and closer guesses to potential solutions. The loop terminates early if all OPs successfully converge. The residuals for each OP during each iteration are recorded for convergence studies.

Lower Surface Definition Script

The shock capture surface closes the geometry by bringing the hypothetical extension of the cowl forward. It captures the conical shock structure generated by the leading-edge geometry through a parallel streamlines technique. The lower surface simply scales-down the upper compressive surface streamline until it fits within the shock structure of the leading edge and throat shocks. This only occurs if the shock intersection point is below the lower portion of the isolator shape. If the shock intersection point is above this lower portion, then there is no way to fit in a parallel streamline. For this case, the lower surface is extended forward to meet the hypothetical intersection point of the leading-edge shockwave with the isolator. This process generates a "tongue" like structure that protrudes forward from the isolator, which usually generates a double cowl-lip geometry. However, there are cases where the tongue disappears and a single cowl cut-back is observed. This method is just one way at capturing the leading-edge shockwave, and it can be substituted with a potential method-of-characteristic solver that more adequately cancels the reflected shock generated by the tongue. Also, the method can be inverted into a "Double Busemann" configuration or by just extending the isolator forward to capture the incident shocks. The Lower Surface Definition script can also be parallelized to improve compute times.

Performance Metrics Script

This script in the main routine consolidates relevant information and plots the inlet geometry. Exact values for the contraction ratio and internal contraction ratio are found by taking streamwise slices of the inlet streamtube. The area constriction profile and total height/length variables are also saved. Plotting functions and video playback functions also exist to allow for three-dimensional visualization. Hypothetical on-design inlet performance parameters are calculated by taking area-weighted averages of flow quantities between OPs. Using the ideal compression performance of each streamline and its shock angle, the total pressure loss, compression ratio, cowl Mach number, and throat Mach number can be calculated. These values are saved to a "Compare" struct for future evaluation.

Compare Performance Script

This script compares multiple inlets visually and analytically. A simple ui-retrieve file can be used to allow the user to import the saved workspace files of multiple generated inlets. From these files, the inlets can be shown side-by-side or overlaid on each other. The latest functionality allows the user to compare Gortler Number between inlet designs.

Absent Functionality

Parallelized versions of the inlet design tool do not require certain functions that exist within serial versions of the tool. However, if the total workspace is saved, then these values can be brought into the serial version and run with these functions successfully. The serial version contains plotting functions that can calculate Mach, static pressure, or static temperature along the upper inlet surface, in azimuthal slices, or in axial slices to provide a flowfield visualization feature. The serial version also contains a turbulent and compressible boundary-layer solver for flows with arbitrary pressure gradients. This functionality allows the user to find the hypothetical displacement thickness along each streamline and adjust the geometry for the boundary layer growth. From this solver, the Gortler Number can be calculated when combined with the known radial curvature of the inlet. This may allow the user to predict the location vortical structures or Gortler boundary layer transition. If a certain throat geometry is necessary, a throat transition region can be specified to transition the corrected boundary-layer throat with a known throat geometry. Other functions include a simple outer mold-line tool and a geometric i-j-k and csv data export function.

Further capabilities envisioned for the inlet design tool include surface heat transfer estimates, off-design performance solvers, and a batch-program workflow to run thousands of iterations on different inlet designs. This would accompany a Pareto-front optimization routine that could optimize for specific user criteria. The limits and breakdown of OA theory may also provide insight into the design of enhanced inward-turning compression systems. Other inlet construction techniques are also foreseeable, such as the "Double Busemann—Jaws 2" design.

Code Inputs

The code can either operate with inputs read-in automatically from a spreadsheet file or from statically defined variables in the program. Spreadsheet read-in functions can be built for batch running on a high performance computing (HPC) system. Inputs can be classified as part of different groups: geometric, flow condition, tolerance, or discretization. Geometric inputs listed in Table 1 allow the user to define the appropriate shape transition of the inlet and the leading edge deflection angle of all ICFA contours.

Flow condition variables are parameters that allow the user to define a freestream Mach number, the ratio of specific heats, and the targeted Mach number at the throat for all osculating plane solutions. These variables are listed in Table 2.

Tolerance limits of each iteration loop in the stream-tracing routine script are defined in the third variable group presented in Table 3. Loose tolerances may be used on initial iterations and then tightened on consecutive runs through the code. It is also recommended to make "outer-loop" tolerances less tight than the tolerances defined on the "inner-loops" (make the i-loop tighter than the k-loop, for instance). Also, the smoothing variable determines how many potential smoothing loops are given in the code.

Discretization parameters are shown in Table 4. The batch number and total amount of osculating planes are defined. Other variables, such as the ODE step-size and contour lengths, preferably should not be drastically changed. Instead, if output geometries require less output points, a downsampling and endpoint-preserving function is preferably used to export geometries for CAD or CFD mesh generation.

High Level Block Diagram for Inlet Generator

Figure 2:
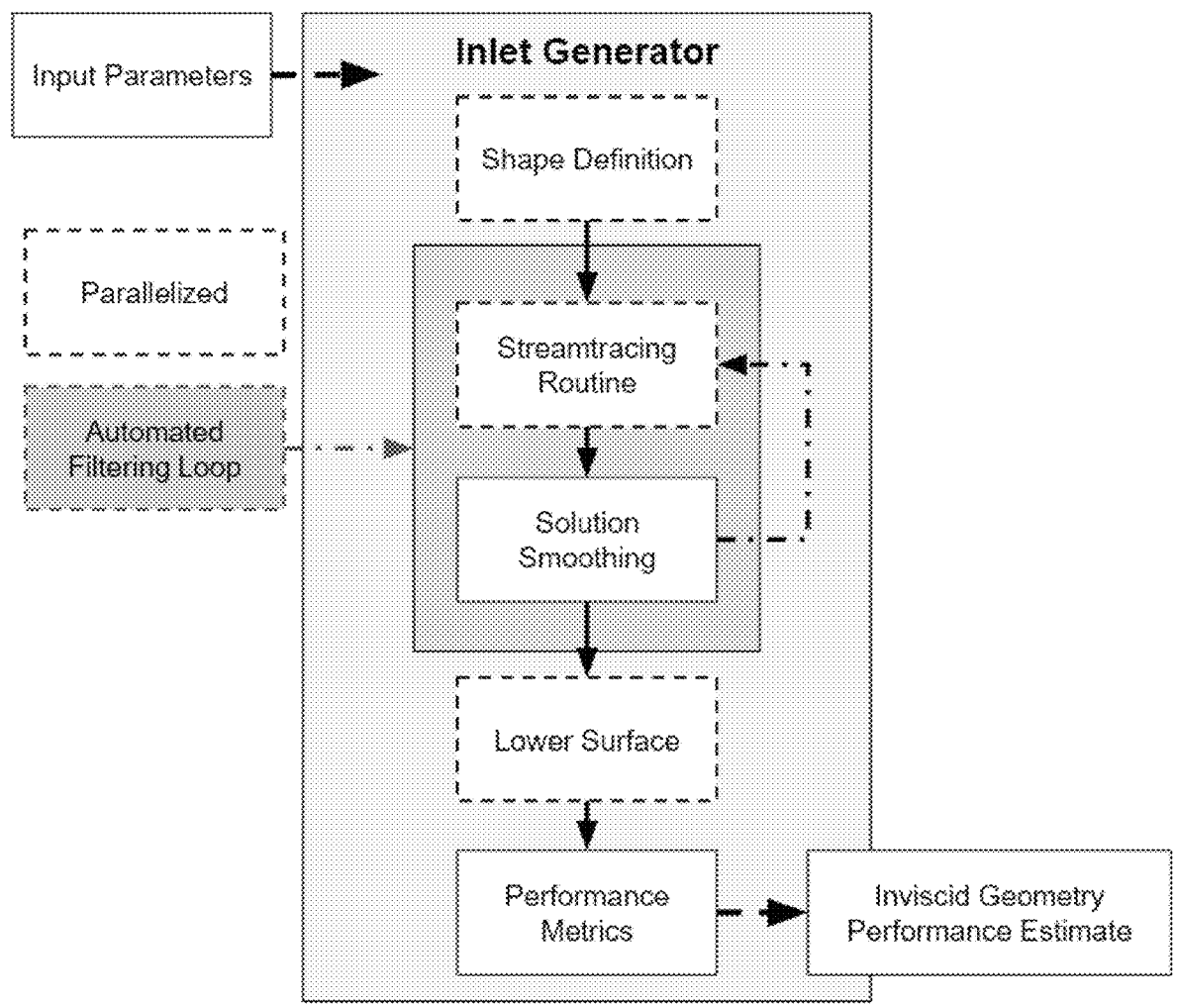
FIG. 2 is a high-level block diagram representing an inlet generator code summarized as a series of functions.

A inlet generator code can be summarized as a series of functions in a high-level block diagram, as represented in FIG. 2. Given inputs are injected into the program as global variables and visible to all scripts. As noted above, certain scripts were parallelized for faster run times, and those are outlined in dashed-blue lines. Additionally, an automated smoothing function takes outputs from the stream-tracing code and feeds them back into the program to ensure convergence of all OPs. At the end of the code block, the Performance Metric script plots the generated inlet for visualization. Certain performance of parameters of interest are saved to the Compare struct variable. Also, the workspace can be saved as a back-up to the "Total_Workspace_#.mat" file. These can be loaded into other scripts or the serial version of the program for more post-processing and analysis.

Figure 3:
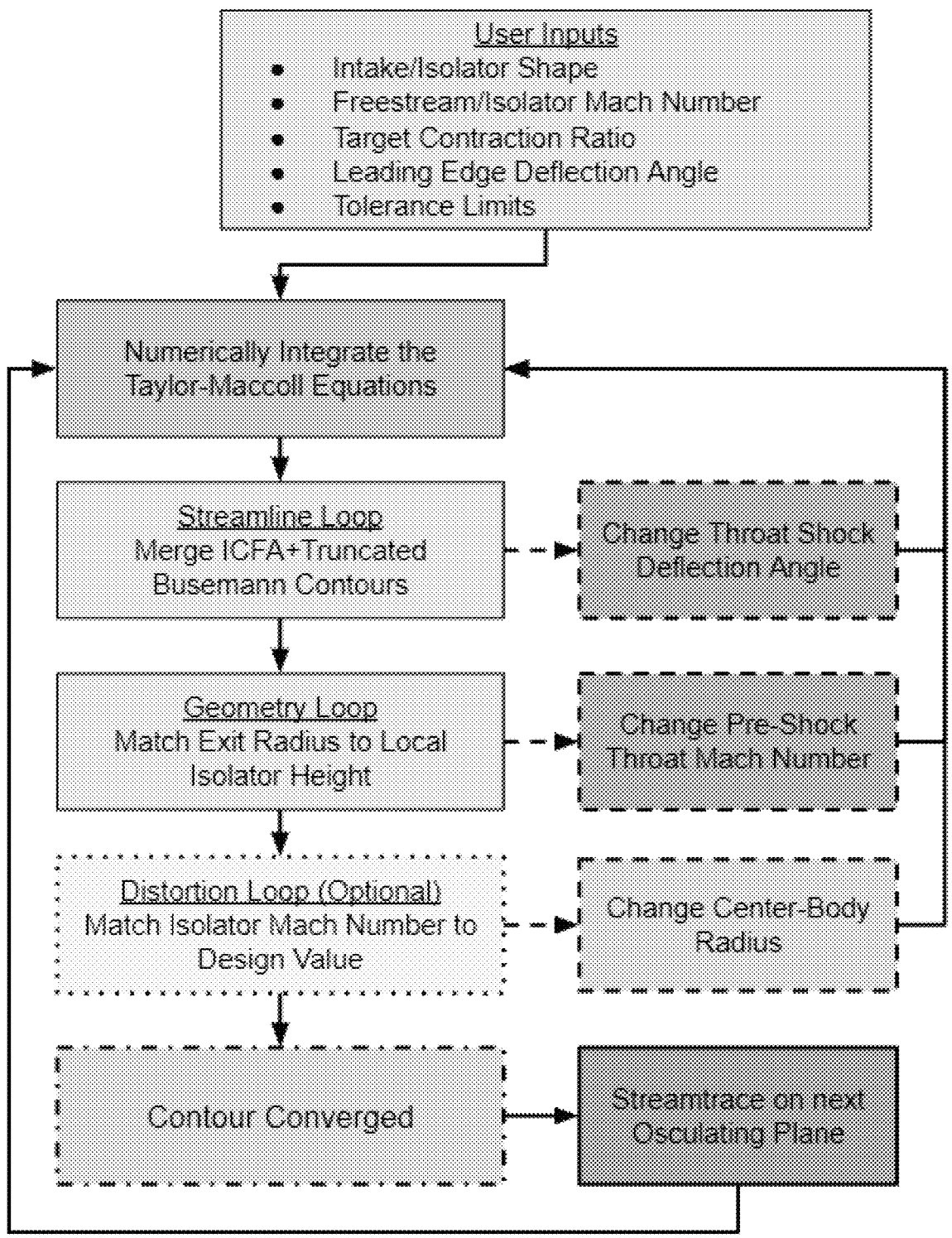
FIG. 3 is a block diagram representing a stream-tracing routine script.

The stream-tracing routine script requires a code-block diagram for itself, such as represented FIG. 3. A given set of inputs from the user and the shape definition script provide the bounds of integration for the Taylor-Maccoll ordinary differential equation solver. A fixed-step Runge Kutta method is called through the ODE-45 cfunction for each iteration. Three free variables may be iterated within a triple-iteration loop for each osculating plane. A secant-based solver may be implemented in each loop to hasten convergence times. The outer-most 1-loop, which sweeps through different OPs, can also be parallelized to speed convergence.

Figure 4:
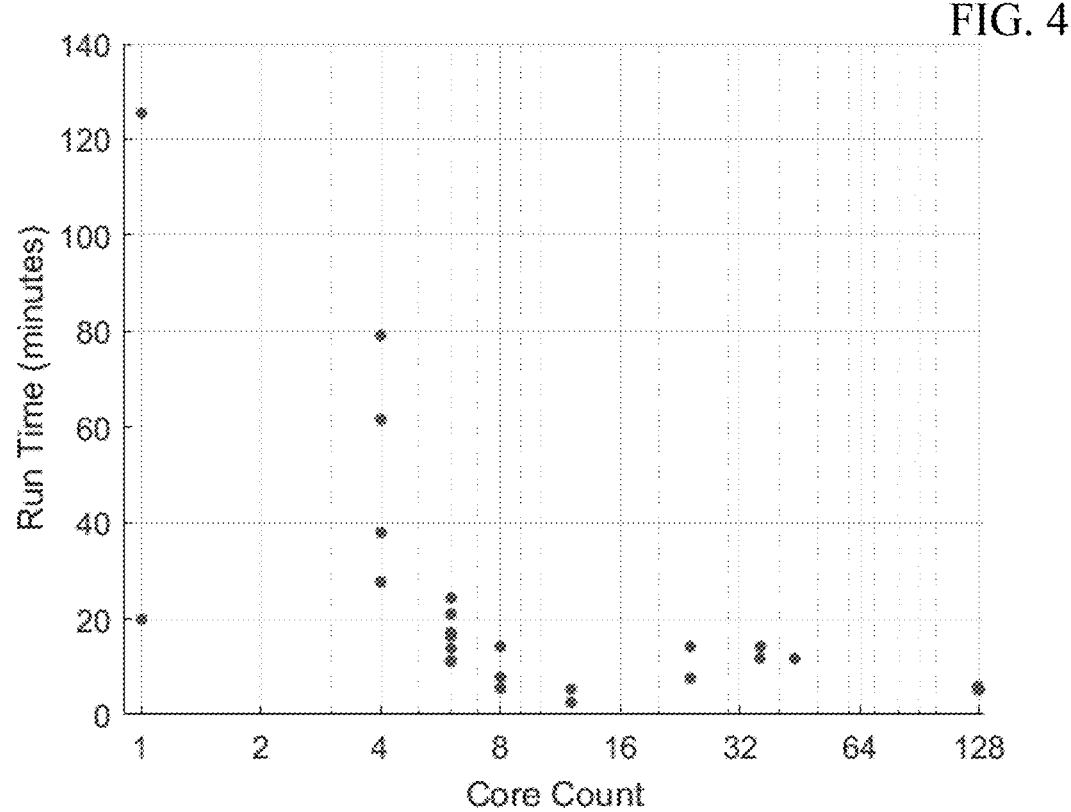
FIGS. 4 and 5 are graphs representing run times for first and second iteration passes of a stream-tracing routine script.

In investigations leading to the invention, several different systems were used to run the inlet generator program and its parallelized scripts. Each system had a different processor, different amount of RAM, and different processor clock speeds. The single-core, quad-core, and hexa-core processors were personal computers. Any data point that used a core count of twelve or more was run on either an AFRL Portal node, HPC Mustang, or HPC Narwhal. The slowest part of the program was the stream-tracing routine, which contains the triple-iteration loop that converges for all OPs. This particular script was tracked to determine the benefits of parallelization. FIG. 4 shows run times of this script for a first-iteration pass. A clear trend emerged when the number of logical processors increased. A drastic 27× speed-up was seen for the best-case scenarios.

Figure 5:
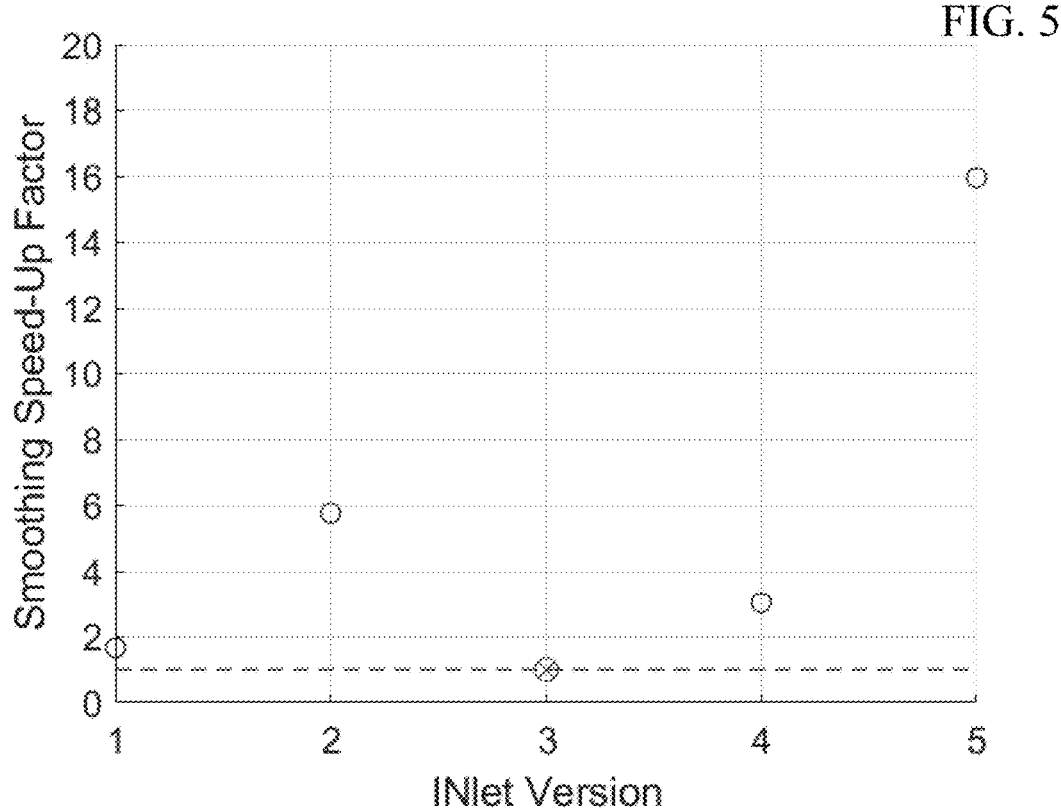
Figure 6:
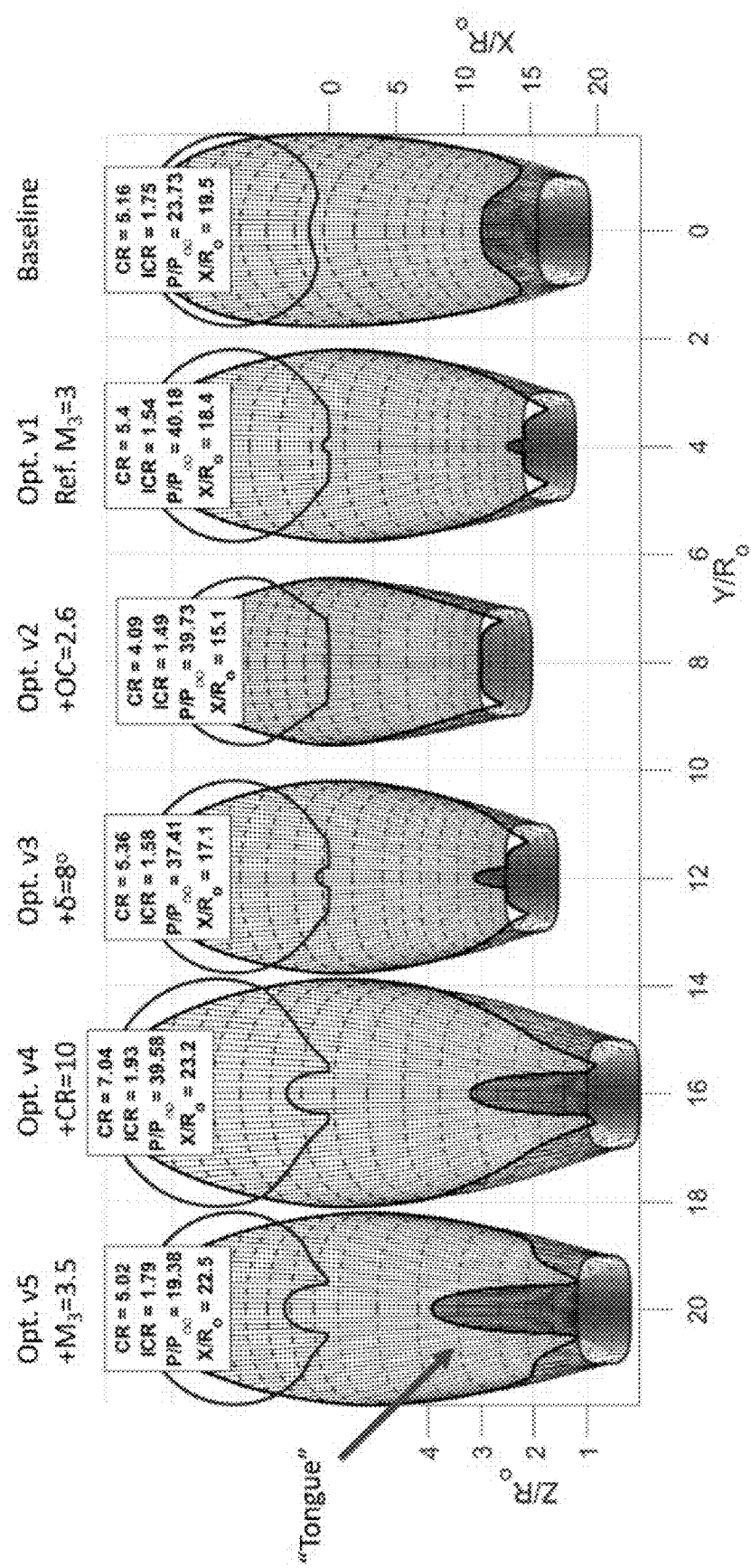
FIG. 6 schematically represents a family of inlets generated from a baseline inlet.
Figure 7:
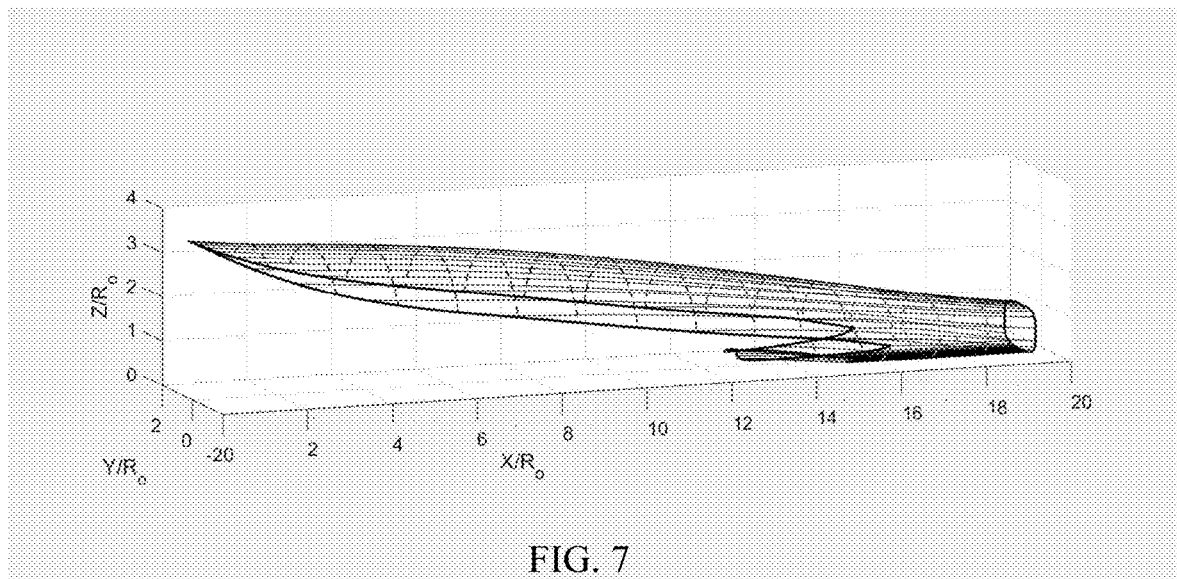
FIG. 7 contains a three-dimensional graphical representation of a baseline inlet of the family of inlets of FIG. 6.
Figure 8:
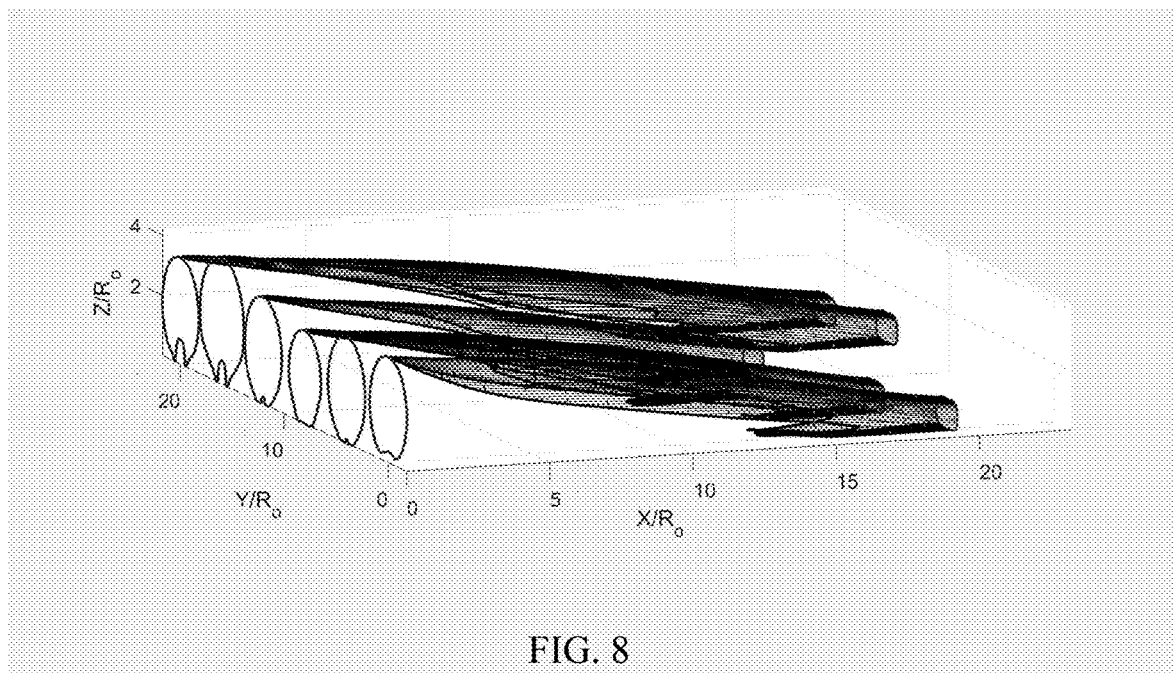
FIG. 8 contains three-dimensional graphical representations of the family of inlets of FIG. 6.

The first-iteration passes were the most computationally expensive. However, successive iterations have past guesses that promote convergence rates. This also decreases computational cost depending on the specific geometry. FIG. 5 represents increased speeds observed in a second iteration of the stream-tracing regime for a family of inlets represented in FIGS. 6, 7, and 8. This family was a class of circular to rectangular shape-transitioning, high-speed inlets designed for a Mach 6 freestream flow at 0° angle-of-attack. A baseline inlet, represented in an isolated view in FIG. 7 and designed with the stream-tracing code, was not optimized for a specific isolator Mach number. The optimization loop was intentionally left deactivated. Using the same defined shape transition, a variety of input parameters were modified to study changes in the generated geometry and theoretical inviscid performance. Additional inlets were also optimized to a set isolator Mach number in all osculating planes. FIGS. 6 and 8 represent five additional inlets that were generated by changing offset circle size (input: static centerbody radius), leading deflection angle, target contraction ratio, and isolator Mach number. Table 5 shows a list of modified variables for each additional inlet and how they affect the geometry or performance.

FIG. 6 provides a visual comparison of the baseline and additional inlets generated by the method described above. Four of the additional inlets contain a lower-surface "tongue" that extends forward. The presence of the tongues was not a numerical anomaly. The shockwave generated by the leading surface must be captured by bringing the cowl enclosure forward. When this occurs, the shock is completely captured by such tongues, which provide an "on-lip" condition with no spillage.

It should be noted that the tongues are not necessary or present in every inlet represented in FIG. 6. Since the tongue itself is a manifestation of the leading edge shock structure, it could be changed by altering the geometric inputs, such as offset circle radius or leading edge deflection angle along the ICFA contours. Also, since individual solutions to each osculating plane are not unique, it maybe possible to force this parameter to converge to a design within the filtering/smoothing script. This allows the user to define a centerbody function that creates a favorable shock structure, especially at low osculating plane angles where the tongue first develops.

Additional aspects and advantages of methods disclosed above will be further appreciated from nonlimiting embodiments, investigations, etc., described in Appendices A and B, attached hereto and forming parts of this Detailed Description of the Invention.

As previously noted above, though the foregoing detailed description describes certain aspects of one or more particular embodiments of the invention and investigations associated with the invention, alternatives could be adopted by one skilled in the art. For example, inlets could differ in appearance and construction from the embodiments described herein and shown in the drawings. As such, and again as was previously noted, it should be understood that the invention is not necessarily limited to any particular embodiment described herein or illustrated in the drawings.

The invention claimed is:

1. A computer-implemented method of generating a design of an inlet for hypersonic air breathing vehicles using a processor system comprising a plurality of CPUs, the method comprising:
   generating a hypothetical inlet shape by specifying a hypothetical front inlet shape of the inlet and an isolator exit shape of the inlet to match an estimated design contraction ratio;
   defining a plurality of osculating planes over an azimuthal sweep of the inlet emanating from a global origin;
   solving in parallel on a plurality of free CPUs in the processor system for unique Busemann contour solutions from Taylor-Maccoll equations for conical flow in each osculating plane of the inlet by changing boundary conditions;
   generating a streamtrace of the inlet from the unique Busemann contour solution in each osculating plane, wherein the streamtraces collectively define the shape of the inlet; and
   generating the design of the inlet to have a shape defined by the streamtraces.

2. The computer-implemented method according to claim 1, wherein the method comprises tuning the post throat shock Mach number of the inlet.

3. The computer-implemented method according to claim 1, wherein the method comprises designing a shock-capture surface using a parallel streamlines methodology.

4. The computer-implemented method according to claim 1, wherein the method comprises designing a double cowl lip geometry to allow flow to spill overboard.

5. A non-transitory computer-readable storage medium storing instructions that when executed by a computer system cause the computer system to perform the method of generating a design of an inlet for hypersonic air breathing vehicles of claim 1.

6. The method of claim 1, wherein the step of solving comprises:
   merging the unique Busemann contour solutions in each osculating plane with a leading ICFA contour that creates a straight leading-edge shockwave of known strength at each of a plurality of throat shock deflection angles to form a merged streamline.

7. The method of claim 6, wherein the step of solving comprises:
   for each merged streamline, matching an exit radius to a local isolator height at each of a plurality of pre-shock throat Mach numbers until a solution is identified that satisfies streamline limits and geometric convergence limits.

8. The method of claim 7, wherein the step of solving comprises:
   tuning an isolator Mach number for the osculating planes by iterating the solving step at each of a plurality of center-body parameters to change a throat shock angle until a defined tolerance limit is met by the unique Busemann contour solution.

9. A method of creating an inlet for a hypersonic air breathing vehicle, the method comprising:
   using a processor system comprising a plurality of CPUs, generating a design of the inlet by a method comprising:
      generating a hypothetical inlet shape by specifying a hypothetical front inlet shape of the inlet and an isolator exit shape of the inlet to match an estimated design contraction ratio;
      defining a plurality of osculating planes over an azimuthal sweep of the inlet emanating from a global origin;
      solving in parallel on a plurality of free CPUs in the processor system for unique Busemann contour solutions from Taylor-Maccoll equations for conical flow in each osculating plane of the inlet by changing boundary conditions; and
      generating a streamtrace of the inlet from the unique Busemann contour solution in each osculating plane, wherein the streamtraces collectively define the shape of the inlet; and
      generating the design of the inlet to have the shape defined from the streamtraces; and
   fabricating the inlet in accordance with the design generated by the processor system.

* * * * *